(12) United States Patent
Aoki et al.

(10) Patent No.: US 12,734,956 B2
(45) Date of Patent: Sep. 15, 2026

(54) INFORMATION PROCESSING DEVICE

(71) Applicant: TOYOTA JIDOSHA KABUSHIKI KAISHA, Toyota (JP)

(72) Inventors: Takahiro Aoki, Saitama (JP); Ibuki Shimada, Miyoshi (JP); Hirohito Ide, Nagoya (JP); Seiji Suyama, Nagakute (JP); Kiyotaka Moriizumi, Nisshin (JP); Kazuyuki Inoue, Nagoya (JP); Tomokazu Maya, Nagoya (JP); Naoya Oka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/981,895

(22) Filed: Dec. 16, 2024

(65) Prior Publication Data

US 2025/0214504 A1 Jul. 3, 2025

(30) Foreign Application Priority Data

Dec. 28, 2023 (JP) ................................ 2023-223070

(51) Int. Cl.

| | |
|---|---|
| ***G08G 1/01*** | (2006.01) |
| ***B60Q 1/08*** | (2006.01) |
| ***B60Q 5/00*** | (2006.01) |
| ***B60S 1/08*** | (2006.01) |

(52) U.S. Cl.

CPC ............. *B60Q 1/085* (2013.01); *B60Q 5/005* (2013.01); *B60S 1/0818* (2013.01); *G08G 1/0145* (2013.01)

(58) Field of Classification Search

USPC ...................................................... 701/36, 49

See application file for complete search history.

(56) References Cited

U.S. PATENT DOCUMENTS

| | | | | |
|---|---|---|---|---|
| 7,756,611 | B2 * | 7/2010 | Sugiura | B60K 35/10 701/29.1 |
| 11,055,993 | B2 * | 7/2021 | Campbell | G08G 1/0955 |
| 11,535,264 | B2 * | 12/2022 | Enthaler | G06V 40/28 |
| 2007/0273552 | A1 * | 11/2007 | Tischer | G08G 1/0965 340/910 |
| 2016/0144867 | A1 * | 5/2016 | Delp | B60W 30/181 701/28 |
| 2019/0011910 | A1 * | 1/2019 | Lockwood | B60W 30/0956 |
| 2019/0019413 | A1 * | 1/2019 | Yun | B60W 30/0956 |
| 2019/0139414 | A1 * | 5/2019 | Morimura | G08G 1/0125 |
| 2019/0263422 | A1 * | 8/2019 | Enthaler | G07C 9/00 |
| 2019/0275927 | A1 * | 9/2019 | Beebe | B60Q 1/2665 |
| 2019/0333371 | A1 * | 10/2019 | Julian | G08G 1/052 |
| 2020/0193818 | A1 * | 6/2020 | Cross | G08G 1/087 |

(Continued)

FOREIGN PATENT DOCUMENTS

JP 2009-146138 A 7/2009

*Primary Examiner* — Jonathan L Sample

(74) *Attorney, Agent, or Firm* — SoraIP, Inc.

(57) ABSTRACT

An information processing device includes a communication unit and a control unit. The communication unit is capable of communicating with a plurality of vehicles. The control unit calculates the switching timing of the hand signal based on the traffic amount in the vicinity of the intersection, identifies the head vehicle stopped at the intersection, and controls the in-vehicle device capable of recognizing the operation from the outside of the head vehicle provided in the head vehicle via the communication unit based on the switching timing.

8 Claims, 5 Drawing Sheets

(56) References Cited

U.S. PATENT DOCUMENTS

| | | | | |
|---|---|---|---|---|
| 2020/0294396 | A1* | 9/2020 | Cross | G08G 1/133 |
| 2021/0304617 | A1* | 9/2021 | Ahire | G05D 1/0212 |
| 2021/0380138 | A1* | 12/2021 | Kucharski | B60R 25/102 |
| 2023/0067538 | A1* | 3/2023 | Willoughby | B60W 60/001 |
| 2023/0103625 | A1* | 4/2023 | Burrell | G06Q 50/26 |
| | | | | 705/325 |

* cited by examiner

1
INFORMATION PROCESSING DEVICE
10
30
5
20
20A
40
INTERSECTION
41
20A
20

INFORMATION PROCESSING DEVICE

CROSS-REFERENCE TO RELATED APPLICATION

This application claims priority to Japanese Patent Application No. 2023-223070 filed on Dec. 28, 2023, incorporated herein by reference in its entirety.

BACKGROUND

1. Technical Field

The present disclosure relates to an information processing device.

2. Description of Related Art

Hitherto, there has been proposed a traffic signal control device that controls a traffic signal to eliminate traffic congestion at an intersection by grasping a traffic congestion status of a road leading to the intersection based on probe information collected from a probe vehicle (see, for example, Japanese Unexamined Patent Application Publication No. 2009-146138 (JP 2009-146138 A)).

SUMMARY

When a traffic signal cannot be used in the event of a disaster caused by an earthquake or a lightning strike or in the event of a power failure, or when traffic congestion occurs at an intersection without a traffic signal, a police officer who is a traffic controller may perform traffic control by hand signals. In the method of the related art, information on signal switching cannot be provided to the police officer who performs traffic control. Therefore, it is not possible to appropriately assist the police officer. Thus, the police officer needs to perform traffic control by intuition.

In view of such circumstances, an object of the present disclosure is to reduce traffic congestion by assisting traffic control performed by hand signals.

An information processing device according to an embodiment of the present disclosure includes: a communication unit configured to communicate with a plurality of vehicles; and a control unit configured to calculate a switching timing of hand signals based on a traffic volume near an intersection, identify a head vehicle stopped at the intersection, and control, based on the switching timing via the communication unit, an in-vehicle device provided in the head vehicle and configured to perform an operation recognizable from an outside of the head vehicle.

According to the present disclosure, it is possible to reduce traffic congestion by assisting traffic control performed by hand signals.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
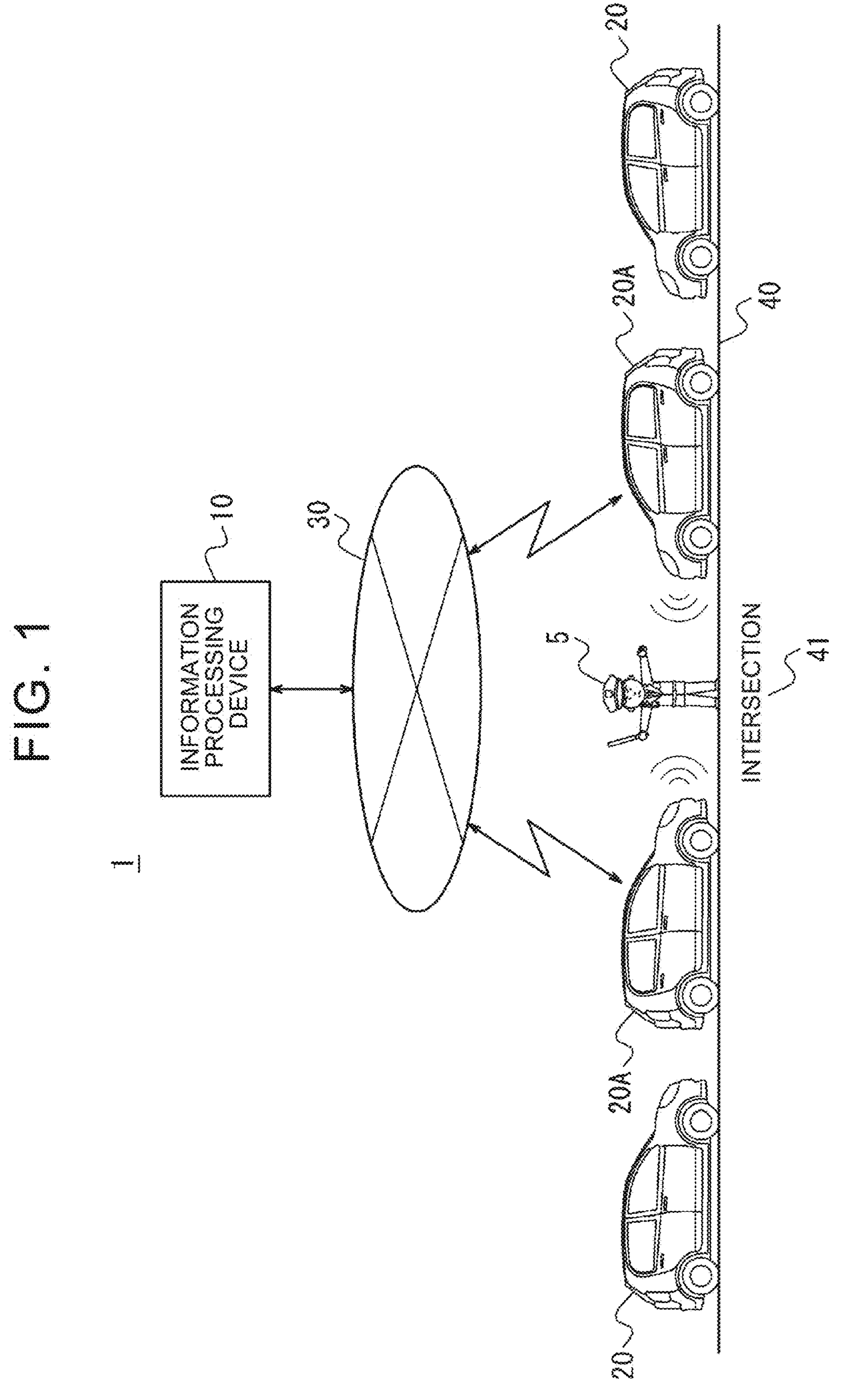
FIG. 1 is a diagram illustrating a traffic control system including an information processing device according to an embodiment.

Hereinafter, an embodiment of the present disclosure will be described below with reference to the drawings. Note that the drawings used in the following description are schematic. Dimension ratios or the like in the drawings do not necessarily accord with actual dimension ratios.

Traffic Control System

FIG. 1 is a diagram schematically illustrating an overall configuration of a traffic control system 1 including an information processing device 10 of the present disclosure. The traffic control system 1 includes a plurality of vehicles 20 traveling on a road 40 in addition to the information processing device 10. The information processing device 10 and the vehicle 20 are configured to be able to communicate with each other via the network 30. The network 30 includes the Internet, a wireless communication network provided by a mobile communication carrier, and the like.

The information processing device 10 can identify an intersection 41 where the police officer 5 performs traffic control. The intersection 41 is, for example, a cross road in which two roads 40 intersect a cross. The police officer 5 causes the vehicle 20 of one road 40 to pass through the inside of the intersection 41 by a manual signal, and stops the vehicle 20 of the other road 40 in front of the intersection 41. The police officer 5 sequentially switches between the road 40 on the passing side through the inside of the intersection 41 and the road 40 on the stopping side that stops the vehicle 20 in front of the intersection 41 by a manual signal.

The information processing device 10 can collect information on the traffic amount in the vicinity of the intersection 41. In the present application, the "neighborhood" is a range in which the passage of the vehicle 20 at the intersection 41 affects congestion on the road 40. The "neighborhood" can be set, for example, from the intersection 41 to 100 m, 300 m, or 1 km. "Neighborhood" can be replaced with "perimeter."

The information processing device 10 calculates the switching timing between the road 40 on the traffic side and the road 40 on the stop side by the hand signal of the police officer 5 based on the information on the traffic volume. The information processing device 10 specifies the head vehicle 20A that is stopped on the stopping-side road 40, and transmits the control data to the head vehicle 20A when the switching timing is reached. Upon receiving the control data, the head vehicle 20A operates the in-vehicle device 25 (see FIG. 3) capable of recognizing the operation from the outside, and signals the police officer 5 that the timing is the switching timing.

Upon receiving a signal indicating the switching timing from the head vehicle 20A, the police officer 5 stops the vehicle 20 on the road that was the passing side until then by performing a predetermined operation of the hand signal, and causes the vehicle 20 that was stopped on the road that was the stopping side to pass into the intersection 41.

Note that the information processing device 10 may manage not only the intersection 41 where the police officer 5 performs traffic control by a manual signal, but also an intersection where a traffic light is present. The information processing device 10 may transmit the calculated information on the switching timing as control information to a traffic light to switch the signal.

A more detailed description of the configuration and operation of each part of the traffic control system 1 will be given below.

Configuration of Information Processing Device

Figure 2:
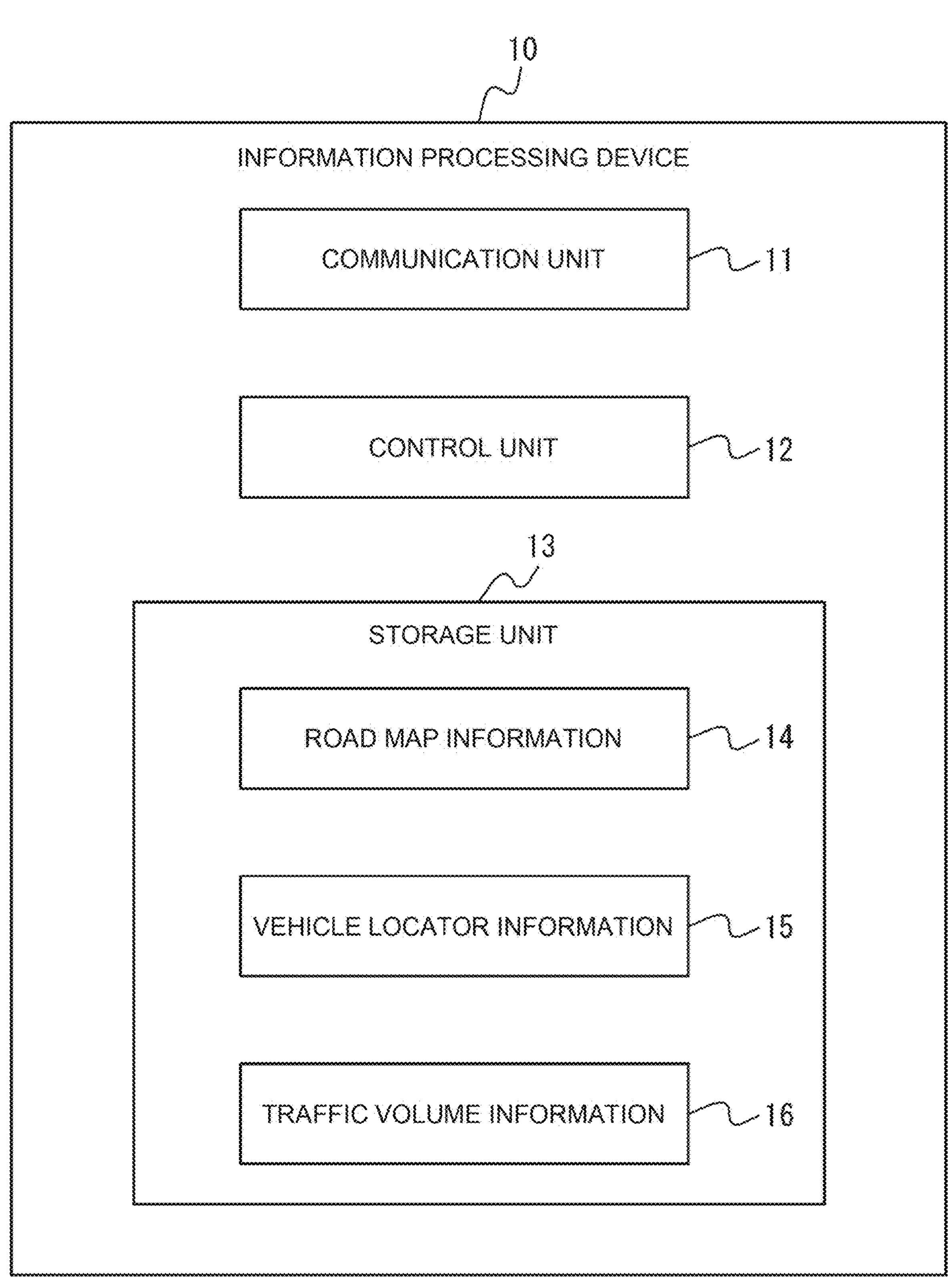
FIG. 2 is a block diagram illustrating a schematic configuration of the information processing device of FIG. 1.

The information processing device 10 is a computer such as a Personal Computer (PC), a workstation, servers, or a special purpose computer designed for a special purpose. As illustrated in FIG. 2, the information processing device 10 includes a communication unit 11, a control unit 12, and a storage unit 13. The information processing device 10 may further include an input unit that receives input of information from the outside and an output unit that outputs information to the outside. The input unit includes, for example, a keyboard, a mouse, and the like. The output unit includes a display, a printer, and the like.

The communication unit 11 includes at least one external communication interface connected to the network 30. The external communication interface may be either a wired communication or a wireless communication interface. For wired communication, the communication interface is, for example, a Local Area Network (LAN) interface or a Universal Serial Bus (USB). For radio communication, the external communication interface is an interface compatible with a mobile communication standard such as Long Term Evolution (LTE), 4th generation (4G), or 5th generation (5G). The communication unit 11 receives data used for the operation of the information processing device 10, and transmits data obtained by the operation of the information processing device 10 to the outside. The communication unit 11 can communicate with the vehicle 20, acquire information from the vehicle 20 including the position information of the vehicle 20, and transmit control information to the in-vehicle device 25 of the vehicle 20.

The control unit 12 includes at least one processor, at least one dedicated circuit, or a combination thereof. A processor is a general-purpose processor such as central processing unit (CPU) or graphics processing unit (GPU), or a special-purpose processor specialized for a particular process. The dedicated circuitry is, for example, field-programmable gate array (FPGA) or application specific integrated circuit (ASIC). The control unit 12 executes processing related to the operation of the information processing device 10 while controlling each unit of the information processing device 10.

The storage unit 13 includes at least one semiconductor memory, at least one magnetic memory, at least one optical memory, or a combination of at least two types thereof. Semiconductor memories are, for example, random access memory (RAM) or read only memory (ROM). RAM is, for example, static random access memory (SRAM) or dynamic random access memory (DRAM). ROM is, for example, electrically erasable programmable read only memory (EEPROM). The storage unit 13 functions as, for example, a main storage device, an auxiliary storage device, or a cache memory. The storage unit 13 stores programs and data used for the operation of the information processing device 10 and data obtained by the operation of the information processing device 10. The information stored in the storage unit 13 may be updatable by, for example, information acquired from the network 30 via the communication unit 11.

The storage unit 13 may store and manage road and traffic related data such as the road map information 14, the vehicle position information 15, and the traffic volume information 16.

The road map information 14 is information of a road map of a range that the information processing device 10 sets as a target of traffic arrangement. The road map information 14 includes information on the position of the intersection 41 and information on the position, shape, number of lanes, and the like of the road 40 around the intersection 41. The position information of the intersection 41 and the road 40 may be stored as absolute position information represented by latitude, longitude, and the like.

The vehicle position information 15 includes position information of the vehicle 20 that the information processing device 10 is traveling within a range to be subjected to traffic arrangement. The vehicle 20 is configured to transmit the position at each time point to the information processing device 10 periodically or irregularly. The information processing device 10 grasps the current position of each vehicle 20 in real time based on the position information of the vehicle 20 transmitted from the vehicle 20, and stores the latest vehicle position information 15 in the storage unit 13. The vehicle position information 15 stored in the storage unit 13 is sequentially updated based on the position information acquired from each vehicle 20.

The traffic volume information 16 is information on the traffic volume of the road 40 around the intersection 41. The traffic amount information may include at least one of information on occurrence of a traffic jam, information on a degree of the traffic jam, information on an average hour speed of the vehicle 20, information on a time required for passing the intersection 41, and the like. The information processing device 10 may acquire or generate the traffic volume information 16 by any method. As an example, the information processing device 10 may use the plurality of vehicles 20 as a probe car to acquire position and speed information from each vehicle 20 traveling around the intersection 41. The information processing device 10 may determine the traffic volume or the traffic jam situation around the intersection 41 from the acquired information on the position and speed of each vehicle 20. As another example, the information processing device 10 may acquire the traffic amount information from the server of the operator that provides the traffic information outside the traffic control system 1 via the communication unit 11.

The control unit 12 can determine the switching timing of the hand signal on the basis of the traffic volume information 16 around the intersection 41 that is the object of traffic arrangement. For example, in the intersection 41 where the two roads 40 intersect, the switching timing of the hand signal may be determined so that the time that the road 40 having a larger traffic volume can travel is longer than that of the road 40 having a smaller traffic volume. By doing so, it is possible to reduce the occurrence of traffic jam.

In addition, the control unit 12 may determine the switching timing of the hand signal so as to coordinate a plurality of intersections 41 on the same route. For example, the control unit 12 may determine the switching timing of the hand signal so that the vehicles 20 traveling on the road can sequentially pass through the plurality of intersections 41 on the road where the traffic volume is large and congestion or congestion occurs, based on the traffic volume information and/or the traffic jam information. That is, the control unit 12 may determine the switching timing of the hand signal so as to optimize the traffic of the road including the plurality of intersections 41. In this case, the plurality of intersections 41 may include an intersection 41 in which a traffic light controllable from the information processing device 10 is provided, and an intersection 41 in which the police officer 5 performs traffic control.

The control unit 12 can recognize the head vehicle 20A located at the head from among the vehicles 20 that are stopped side by side in front of the intersection 41 that is the object of traffic arrangement. For example, the control unit 12 may determine the head vehicle 20A based on the road map information 14 and the vehicle position information 15. Further, for example, as will be described later, the vehicle 20 may have a function of determining whether or not the host vehicle is in the head vehicle 20A, and the control unit 12 may acquire the information of the head vehicle 20A from the vehicle 20. The control unit 12 can transmit control data for controlling the in-vehicle device 25 to the head vehicle 20A based on the hand-signal switching timing.

Configuration of Vehicle

Figure 3:
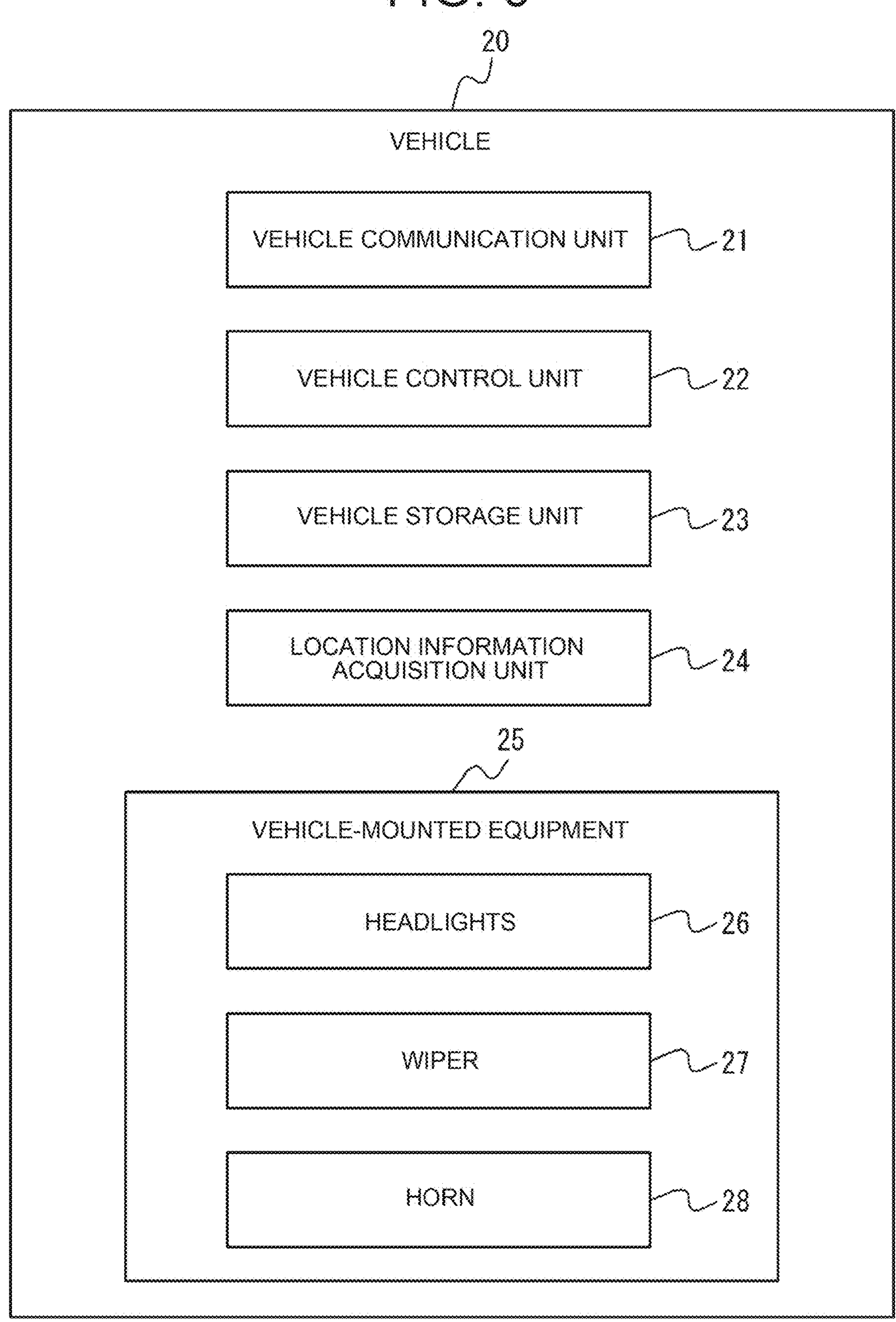
FIG. 3 is a block diagram showing a schematic configuration of the vehicle of FIG. 1.

In the present application, the vehicle 20 includes, but is not limited to, a passenger car, a truck, a bus, a large and small special motor vehicle, and the like. Vehicle 20 includes various types of vehicles 20 that may be realized in the future. As illustrated in FIG. 3, the vehicle 20 includes a vehicle communication unit 21, a vehicle control unit 22, a vehicle storage unit 23, a position information acquisition unit 24, and an in-vehicle device 25.

The vehicle communication unit 21 includes an external communication interface that transmits and receives information to and from a system outside the vehicle 20 using wireless communication. The vehicle communication unit 21 may perform communication using any one or more of a fourth-generation mobile communication system (4G), a fifth-generation mobile communication system (5G), a Wi-Fi (registered trademark), a Worldwide Interoperability for Microwave Access (WiMAX), and the like. The vehicle communication unit 21 is configured to be able to transmit and receive information to and from the communication unit 11 of the information processing device 10.

Like the control unit 12 of the information processing device 10, the vehicle control unit 22 includes at least one processor, at least one dedicated circuit, or a combination thereof. The vehicle control unit 22 periodically or irregularly transmits the current position information acquired by the position information acquisition unit 24 to the information processing device 10. In addition, when waiting for the hand signal to be switched on the road 40 on the stop side of the vehicle 20, the vehicle control unit 22 may determine whether or not the host vehicle is located at the head of the vehicle 20 waiting for the signal by an arbitrary method. For example, each vehicle 20 may be provided with a sensor for detecting the vehicle 20 ahead, and may determine whether there is another vehicle 20 ahead while the host vehicle is stopping in front of the intersection 41. Sensors for detecting the front vehicles 20 include, for example, Light Detection and Ranging (LIDAR), millimeter-wave radar, ultrasonic sensors, cameras, and the like. When another vehicle is not detected in front of the intersection 41 while it is stopped, for example, within a short distance of 5 meters or less, the vehicle control unit 22 can recognize the host vehicle as the head vehicle 20A. The vehicle control unit 22 of the head vehicle 20A may notify the information processing device 10 that the host vehicle is the head vehicle 20A via the vehicle communication unit 21. As described above, the control unit 12 of the information processing device 10 may identify the head vehicle 20A. Further, the vehicle control unit 22 can receive control information from the information processing device 10 via the vehicle communication unit 21 and control the in-vehicle device 25 based on the control information.

Like the storage unit 13 of the information processing device 10, the vehicle storage unit 23 includes at least one semiconductor memory, at least one magnetic memory, at least one optical memory, or any combination thereof. The vehicle storage unit 23 stores a program executed by the vehicle control unit 22, data used for the operation of the vehicle control unit 22, data obtained by the operation of the vehicle control unit 22, and the like. The vehicle storage unit 23 may store map information of the road 40 on which the vehicle 20 travels. Further, the vehicle storage unit 23 may store a control pattern of the in-vehicle device 25 corresponding to the type of the in-vehicle device 25 at the time of signaling the police officer 5 to switch the hand signal.

The position information acquisition unit 24 is configured to be able to acquire information on the present position of the vehicle 20 from a Global Navigation Satellite System (GNSS) receiver mounted on the vehicle 20. The position information acquisition unit 24 transfers the acquired current position information to the vehicle control unit 22. GNSS receiver is a satellite-based global positioning receiver. GNSS include Global Positioning System (GPS), Global Navigation Satellite System (GLONASS), Galileo, BeiDou, etc. The current position information of the vehicle 20 acquired by the position information acquisition unit 24 may be absolute position information represented by latitude, longitude, and the like.

The in-vehicle device 25 is provided in the vehicle 20 and is capable of recognizing an operation from the outside. The in-vehicle device 25 is used to send a signal from the head vehicle 20A to the police officer 5 to notify the switching timing of the manual signal. The in-vehicle device 25 may include, for example, at least one or more of a headlight 26, a wiper 27, and a horn 28. The headlight 26 can notify the switching timing by, for example, blinking. The wiper 27 can notify the switching timing by, for example, performing an operation of moving at a high speed to the left and right on the front windshield. The horn 28 can notify the switching timing by, for example, intermittently emitting horn sounds. The in-vehicle devices 25 may include Electronic Control Unit (ECU) of the in-vehicle devices 25. The in-vehicle device 25 may be operated by the vehicle control unit 22 based on the control data transmitted from the information processing device 10 to the head vehicle 20A.

The vehicle control unit 22 may operate the in-vehicle device 25 according to a unique operation pattern for notifying the switching timing of the hand signal stored in the vehicle storage unit 23. The specific motion pattern includes a motion pattern that is not or cannot be performed by a normal driver by manual operation. For example, the vehicle control unit 22 can cause the in-vehicle device 25 to operate at a higher speed than the operation by the manual operation. For example, the vehicle control unit 22 can cause the headlight 26 to blink faster than the speed at which it can be manually operated. Alternatively, the vehicle control unit 22 may alternately blink the left and right headlights 26. The control unit 12 of the information processing device 10 can transmit the control information to the vehicle control unit 22 to operate the in-vehicle device 25 by an operation method that cannot be manually operated. Note that the unique operation pattern for the hand signal switching timing notification may be stored in the storage unit 13 of the information processing device 10 instead of the vehicle storage unit 23 of the vehicle 20. In this case, the control unit 12 of the information processing device 10 transmits a unique operation pattern to the vehicle 20 when the in-vehicle device 25 is operated. In response to this, the vehicle control unit 22 of the vehicle 20 may operate the in-vehicle device 25 in accordance with the received unique operation pattern.

Use of Traffic Control System

Figure 4:
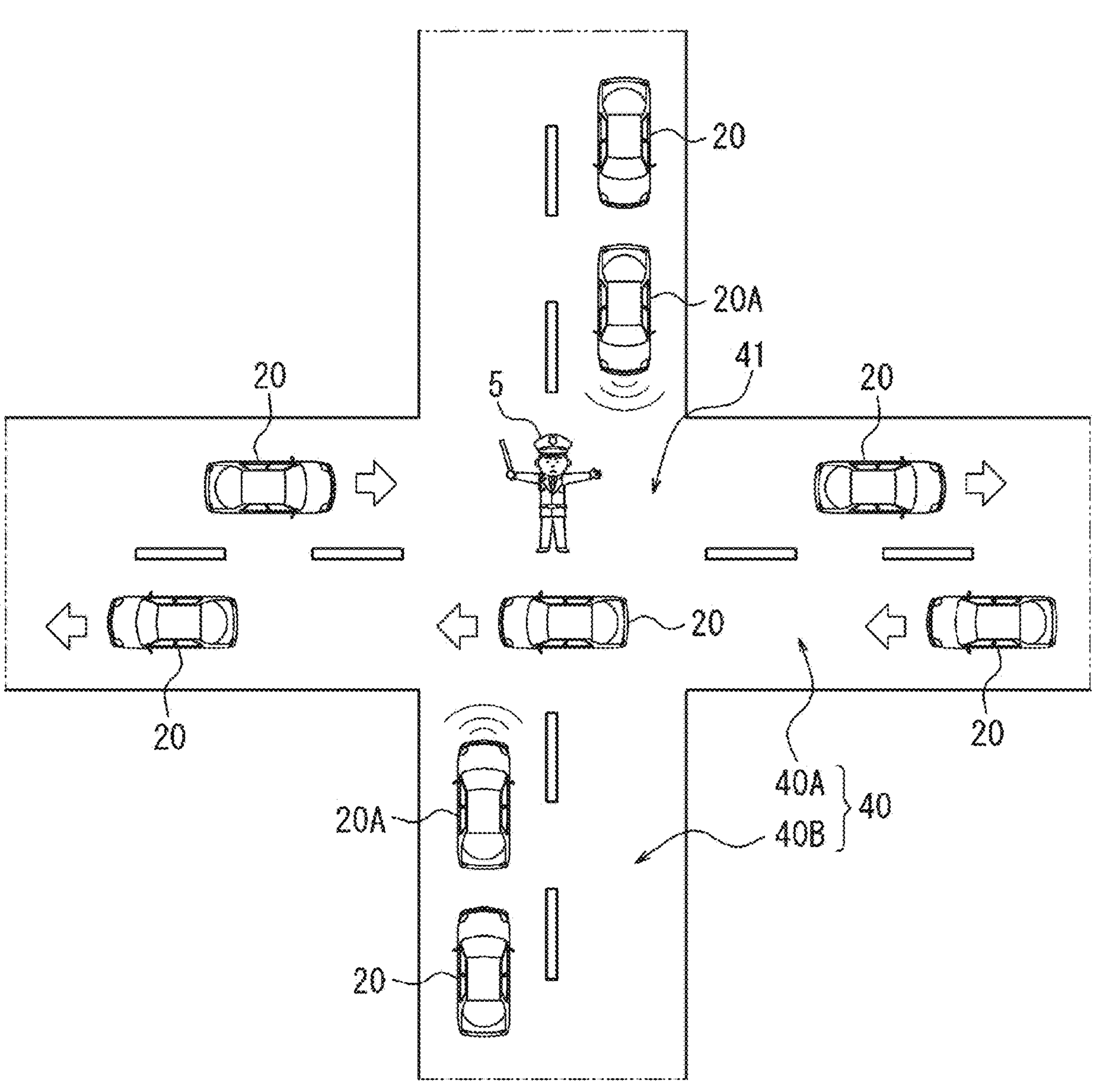
FIG. 4 is a diagram illustrating an exemplary traffic arrangement using the information processing device of FIG. 1.

FIG. 4 shows an example of a usage scene of the traffic control system 1.

In the present embodiment, it is assumed that the police officer 5 arranges traffic at the intersection 41 of the cross road where the first road 40A and the second road 40B intersect. In the condition illustrated in FIG. 4, the police officer 5 causes the vehicle 20 on the first road 40A to pass through the inside of the intersection 41, and stops the vehicle 20 on the second road 40B in front of the intersection 41. The police officer 5 instructs to stop the vehicle by spreading his/her hand toward the vehicle 20 on the second road 40B on the stopping side with the front or back side facing the vehicle.

The control unit 12 of the information processing device 10 can specify the head vehicle 20A in the vehicle 20 waiting for the hand-signal switching in the second road 40B. The control unit 12 may identify the head vehicle 20A by receiving a notification from the head vehicle 20A that the host vehicle is the head vehicle 20A. Alternatively, the control unit 12 may specify the head vehicle 20A from the row of the vehicles 20 waiting for the hand-signal switching based on the detailed present position information acquired from the respective vehicles 20 and the road map information 14.

When the switching timing determined based on the traffic volume of the road 40 in the vicinity of the intersection is reached, the information processing device 10 transmits the control information to the head vehicle 20A among the vehicles 20 waiting for a signal in the second road 40B on the stopping side. Upon receiving the control data, the head vehicle 20A causes the vehicle control unit 22 to operate the in-vehicle device 25 and sends a signal for switching the hand signal to the police officer 5.

The police officer 5 can recognize that the head vehicle 20A in the vehicle 20 waiting for the hand signal switching on the second road 40B signals the hand signal switching, and is the timing of the hand signal switching. The police officer 5, who is signaled to switch the hand signal, stops the entry of the first road 40A into the intersection 41 of the vehicles 20 according to a predetermined sequence. When the vehicle 20 on the first road 40A is stopped, the police officer 5 causes the vehicle 20 waiting in front of the intersection 41 on the second road 40B to pass to the intersection 41. In this way, it is possible to switch between the road 40 on the passing side of the vehicle 20 and the road 40 on the stopping side.

As described above, the traffic at the intersection 41 is controlled by sequentially switching the road on the side where the vehicle 20 passes and the road on the side where the vehicle is stopped between the first road 40A and the second road 40B. The information processing device 10 controls the time-interval for switching the hand-signal based on the traffic volume between the first road 40A and the second road 40B. For example, when the traffic volume of the first road 40A is twice the traffic volume of the second road 40B, the information processing device 10 may sequentially determine the switching timing of the hand signal so that the vehicle 20 on the first road 40A is allowed to pass for two minutes and the vehicle 20 on the second road 40B is allowed to pass for one minute. In addition, for example, when the traffic volume is large and congested in a range in which the first road 40A includes a plurality of adjacent intersections 41, the information processing device 10 may determine the switching timings so that the plurality of adjacent intersections 41 can be sequentially passed along with the travel of the vehicle 20. In this way, the information processing device 10 can eliminate congestion in the first road 40A.

As illustrated in FIG. 4, when the intersection 41 is an intersection of a cross road, the control unit 12 of the information processing device 10 can specify 20A of the head vehicles of both of the two lanes opposed to each other across the intersection 41. The control unit 12 may control the in-vehicle device 25 of the head vehicle 20A specified for each lane based on the same switching timing. That is, the control unit 12 can operate the two in-vehicle devices 25 on the head vehicle 20A across the intersection 41 at substantially the same time based on the same switching timing. In this way, the police officer 5 can reliably recognize the signal indicating the switching timing of the hand signal, even when the police officer 5 faces any side of the vehicle 20 that is stopped.

Further, in FIG. 4, the first road 40A and the second road 40B are roads of one-side one lane, but at least one of the first road 40A and the second road 40B may be a road with two or more lanes on each side. In such cases, the control unit 12 may specify the head vehicle 20A for each lane, and control the in-vehicle device 25 of the head vehicle 20A specified for each lane based on the same switching timing. Also, at least one of the first road 40A and the second road 40B may be a road having a dedicated lane for turning right and/or left in front of the intersection 41. The control unit 12 may control 20A of the head vehicles identified for each lane based on the same timing. In this way, the police officer 5 can recognize the switching timing of the hand signal more clearly.

The police officer 5 may carry a portable terminal. In addition to the above-described signaling of the hand-signal switching timing by the head vehicle 20A, the information processing device 10 may notify the portable terminal carried by the police officer 5 of the switching timing by radio communication. The portable terminal includes a display, a speaker, a vibrator, and the like, and may notify the police officer 5 of the switching timing by image display, sound, and/or vibration.

Processing of the Control Unit of the Information Processing Device

Figure 5:
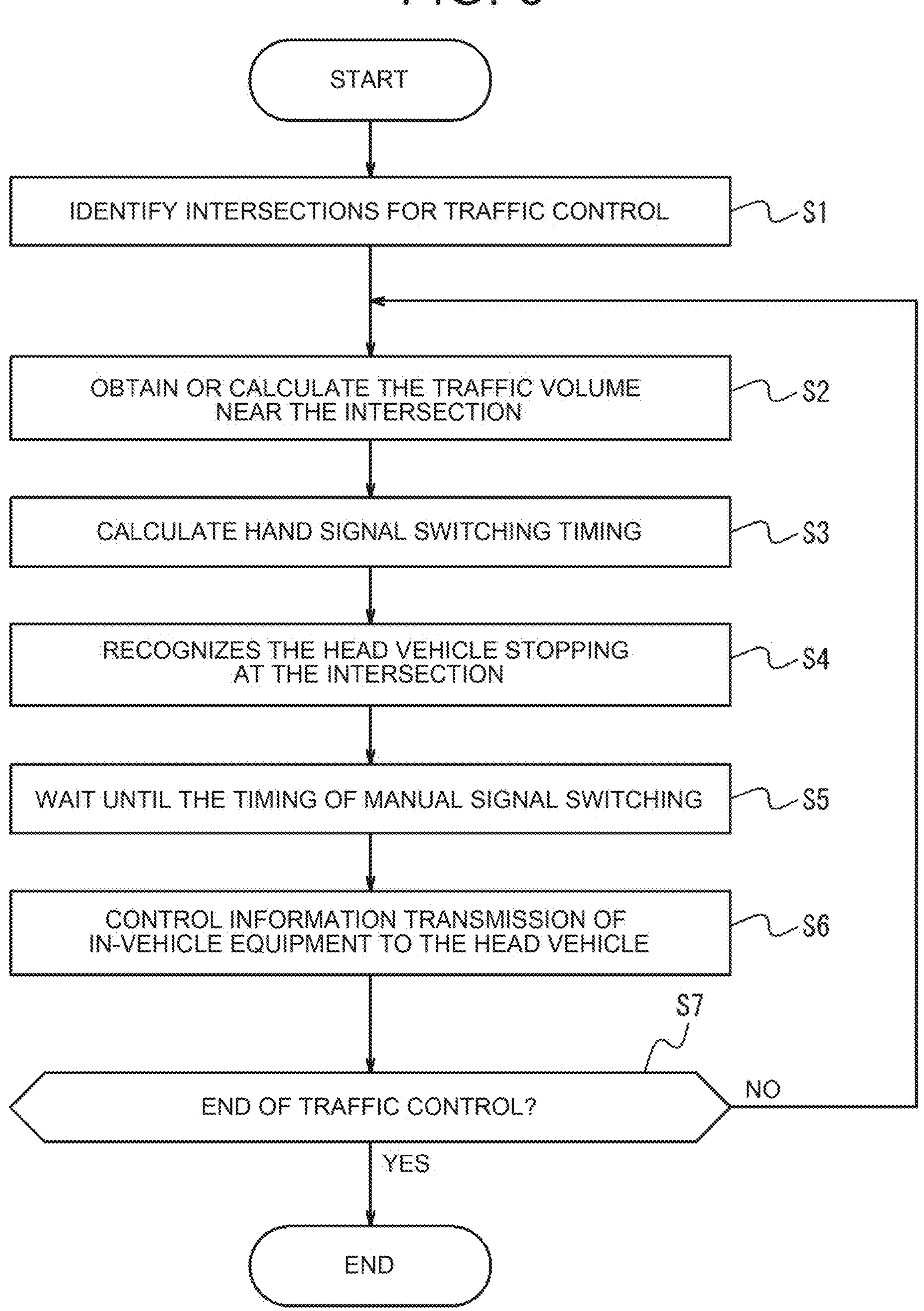
FIG. 5 is a flowchart of processing executed by a control unit of the information processing device.

FIG. 5 is a flowchart illustrating a processing procedure executed by the control unit 12 of the information processing device 10. The function of the information processing device 10 is realized by executing a program for executing the processing of the flowchart of FIG. 5 by a processor corresponding to the control unit 12. That is, the functions of the information processing device 10 are realized by software. The program causes the computer to execute the operation of the information processing device 10, thereby causing the computer to function as the information processing device 10. That is, the computer functions as the information processing device 10 by executing the operation of the information processing device 10 in accordance with the program.

In the present embodiment, the program can be recorded in a computer-readable recording medium. The computer readable recording medium includes a non-transitory computer readable medium, and is, for example, a magnetic recording device, an optical disk, a magneto-optical recording medium, or a semiconductor memory. Distribution of the program is performed, for example, by selling, transferring, or lending a portable recording medium such as a Digital Versatile Disc (DVD) or a Compact Disc Read Only Memory (CD-ROM) in which the program is recorded. Further, the program may be distributed by storing the program in the storage of the external server and transmitting the program from the external server to another computer. Further, the program may be provided as a program product.

In FIG. 5, first, the control unit 12 identifies an intersection 41 to which the police officer 5 performs traffic arrangement (S1). The intersection 41 that performs traffic control is an intersection where a traffic light is disabled due to a power failure, a disaster, or the like, or an intersection where there is no traffic light and traffic congestion occurs due to a large amount of traffic. The intersection 41 at which the police officer 5 performs traffic control may be input to the information processing device 10 by the police officer. Alternatively, information specifying the intersection 41 for traffic arrangement may be transmitted from an information device in the police to the information processing device 10 outside the police.

The control unit 12 acquires or calculates the traffic volume of the road 40 in the vicinity of the intersection 41 of the traffic arrangement target (S2). The acquired or calculated information on the traffic volume is stored in the storage unit 13 as the traffic volume information 16. The traffic volume may be, for example, the number of vehicles 20 passing through a particular location on the road 40 within a unit time. Further, the traffic amount may include, for example, the congestion degree of the road 40 determined from the speed of the vehicle 20 traveling on the road 40. The definition of traffic volume is not limited to these only.

The control unit 12 calculates a hand-signal switching timing based on the traffic volume information 16 of each lane of each of the roads 40 intersecting at the intersection 41 (S3). The switching timing is determined to reduce congestion or congestion of the road 40. The switching timing may be specified as a switching time or a switching interval. In an embodiment, a timing at which the hand signal is switched within one cycle may be calculated as the switching timing. Here, one cycle means, for example, a period from the moment when the hand signal on the first road 40A becomes available to the moment when the hand signal becomes inactive to the next time when the hand signal becomes available to the first road 40A.

The control unit 12 recognizes 20A of the head vehicles stopping at the intersection 41 (S4). The control unit 12 may specify the head vehicle 20A based on the road map information 14 in the storage unit 13 and the detailed vehicle position information 15 of the respective vehicles 20 that are sequentially updated. Alternatively, the control unit 12 may recognize the head vehicle 20A by receiving a notification from the head vehicle 20A that recognizes that the host vehicle is the head vehicle 20A from among the plurality of vehicles 20.

The control unit 12 waits until the hand-signal switching timing calculated by S3 (S5), and transmits the control data of the in-vehicle device 25 to the head vehicle 20A recognized by S4 after the switching timing has elapsed (S6). The head vehicle 20A, which has received the control information, issues a signal for switching the hand signal to the police officer 5 performing the traffic control by the in-vehicle device 25. The hand signal switching signal may include at least one of blinking of the headlight 26, operation of the wiper 27, and the start of a horn sound by the horn 28. In response to this signal, the police officer 5 switches between the road on the traffic side and the road on the stopping side between the first road 40A and the second road 40B intersecting at the intersection 41.

The control unit 12 repeats S7 from S2 with respect to the intersection 41 after the road 40 on the traffic side and the road 40 on the stopping side have been replaced, unless an instruction to terminate the traffic arrangement is received (S7: No). At this time, the road 40 on which the head vehicle 20A is recognized is alternately switched between the first road 40A and the second road 40B every time the hand signal is switched. In addition, since the control unit 12 can grasp the change in the traffic volume in real time each time S2 is executed, the change can be reflected in the calculation of the switching timing in S3. In FIG. 5, the process of S7 is repeated from S2, but if the traffic volume information 16 does not change in a short time, the control unit 12 may mainly return to S4 process when the traffic sorting is not completed by S7 (S7: No). The control unit 12 may return to S2 only once a few times.

When the information processing device 10 is instructed to terminate the traffic arrangement from the outside (S7: Yes), the control unit 12 terminates the process of the flow chart of FIG. 5 for supporting the traffic arrangement for the intersection 41. Such an instruction may be directly input to the information processing device 10 by an official of the police, or may be transmitted to the information processing device 10 by communication from an information device in the police.

As described above, according to the information processing device 10 of the present embodiment, the control unit 12 calculates the hand-signal switching timing based on the traffic volume in the vicinity of the intersection 41, and controls the in-vehicle device 25 provided on the head vehicle 20A. As a result, the information processing device 10 can reduce the traffic jam as compared with the traffic sorting performed by relying on the intuition of the police officer 5 by supporting the traffic sorting performed by the manual signal.

Further, by adopting the traffic control system 1 of the present embodiment, it is possible to reduce the cost of the equipment and the installation work as compared with the case where the traffic signal is renewed to a system that controls the traffic signal based on the traffic volume and the case where the traffic signal is newly installed.

It should be noted that the present disclosure is not limited to the above-described embodiments, and many modifications and variations are possible. For example, the functions included in each means, each step, etc. can be rearranged so as not to be logically inconsistent, and a plurality of means, steps, etc. can be combined into one or divided.

In the above embodiment, the traffic control is performed by the police officer, but the traffic control may not be performed by the police officer. Traffic arrangements may be performed by officials of other traffic management authorities. In the above embodiment, a case has been described in which traffic arrangement is performed at an intersection of a cross road. However, the intersection where traffic is arranged is not limited to a cross road, and may be a three-way road, a five-way road, or the like. Further, in the above-described embodiment, a headlight, a wiper, and a horn are exemplified as the in-vehicle devices. However, the in-vehicle device is not limited thereto. The in-vehicle device may be, for example, a hazard lamp.

What is claimed is:

1. An information processing device comprising:

a communication unit configured to communicate with a plurality of vehicles; and a control unit configured to calculate a timing of switching hand signals performed by a traffic controller at an intersection at which two roads intersect, based on a traffic volume near the intersection, the hand signals including i) a first signal that allows vehicles on a first road of the two roads to pass through the intersection and stops vehicles on a second road of the two roads in front of the intersection and ii) a second signal that allows the vehicles on the second road to pass through the intersection and stops the vehicles on the first road in front of the intersection, identify a head vehicle stopped on a road being held under the hand signals of the two roads at the intersection, determine whether the calculated timing of switching has been reached, and after determining that the calculated timing has been reached, transmit control information to the head vehicle via the communication unit, the control information based on which an in-vehicle device provided in the head vehicle is configured to perform an operation recognizable from an outside of the head vehicle, wherein the head vehicle is configured to operate the in-vehicle device based on the control information.

2. The information processing device according to claim 1, wherein the in-vehicle device includes at least one of a headlight, a wiper, and a horn.

3. The information processing device according to claim 1, wherein the in-vehicle device is configured to perform the operation recognizable from the outside of the head vehicle by an operation method that is not performable manually.

4. The information processing device according to claim 1, wherein the control unit is further configured to, in a case where at least one of the two roads includes a plurality of lanes, identify head vehicles respectively stopped at heads of the lanes, and the head vehicles are configured to operate respective in-vehicle devices based on the control information for the same switching timing.

5. The information processing device according to claim 1, wherein the control unit is further configured to, in a case where the intersection is a crossroad, identify both head vehicles stopped at heads of lanes facing each other across the intersection, and the head vehicles are configured to operate respective in-vehicle devices based on the control information for the same switching timing.

6. The information processing device according to claim 3, wherein the operation is performed by operating the in-vehicle device at a speed higher than a speed manually performable by a user.

7. The information processing device according to claim 3, wherein the in-vehicle device includes a headlight, and the operation is performed by causing the headlight to blink at a rate faster than a rate manually achievable by a user.

8. The information processing device according to claim 3, wherein the in-vehicle device includes left and right headlights, and the operation is performed by causing the left and right headlights to alternately blink.

* * * * *